United States Patent [19]
Green

[11] Patent Number: 5,685,256
[45] Date of Patent: Nov. 11, 1997

[54] SET PRESSURE SENSING AND VERIFYING DEVICE

[75] Inventor: Thomas Charles Green, Aurora, Ill.

[73] Assignee: Gas Research Institute, Chicago, Ill.

[21] Appl. No.: 375,301

[22] Filed: Jan. 20, 1995

[51] Int. Cl.[6] .............................. G08B 5/40; G01L 19/12
[52] U.S. Cl. ............................................. 116/214; 116/266
[58] Field of Search ............................ 116/67 R, 212, 116/214, 266, 211

[56] References Cited

U.S. PATENT DOCUMENTS

| | | | |
|---|---|---|---|
| 2,989,024 | 6/1961 | Tralongo | 116/211 |
| 3,520,275 | 7/1970 | Gawlick et al. | 116/209 |
| 3,581,703 | 6/1971 | Hosack | 116/214 X |
| 3,718,113 | 2/1973 | Scherdler et al. | 116/214 |
| 3,844,248 | 10/1974 | Parker | 116/212 |
| 4,632,052 | 12/1986 | Green | 116/70 |
| 4,698,620 | 10/1987 | Marshall | 116/214 X |
| 4,698,623 | 10/1987 | Smith | 116/212 |
| 4,915,054 | 4/1990 | Vidovic et al. | 116/142 FP |
| 5,088,867 | 2/1992 | Mun | 116/212 X |

*Primary Examiner*—Diego F. F. Gutierrez
*Assistant Examiner*—Willie Morris Worth
*Attorney, Agent, or Firm*—Speckman, Pauley & Fejer

[57] ABSTRACT

A device for detecting soil compaction density comprising at least one shell material forming an enclosure, a failure plane disposed within the shell material which causes the shell material to fail at a preset static or dynamic pressure, and a detector, such as an odoriferous chemical enclosed within the enclosure which is released upon failure of the shell material, thereby indicating that the preset static or dynamic pressure has been achieved.

6 Claims, 6 Drawing Sheets

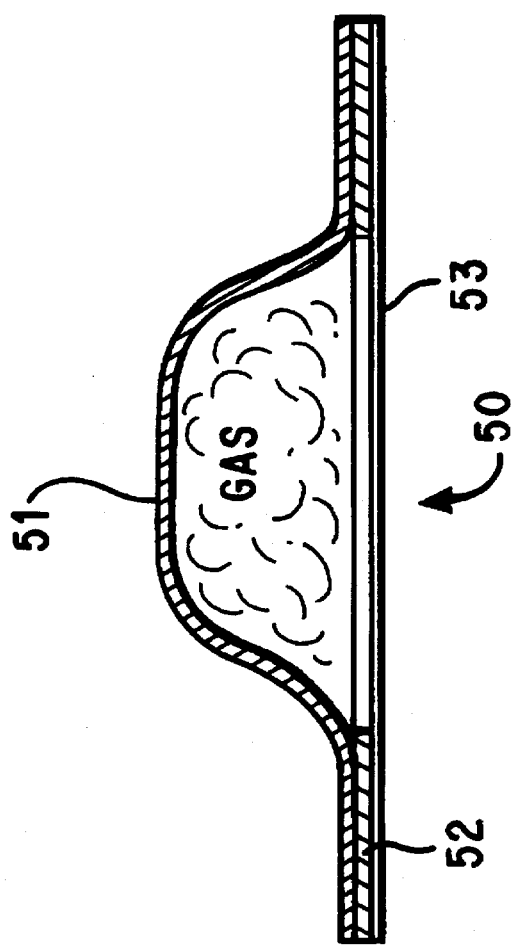

SET PRESSURE SENSING AND VERIFYING DEVICE

BACKGROUND OF THE INVENTION

1. Field of the Invention

This invention is related to a device for detecting the existence or nonexistence of a desired static and/or dynamic pressure. More particularly, this invention is related to a device for detecting soil compaction density to indicate the proper soil compaction during back-filling of holes in the ground, such as gas-line ditches. However, this invention may be applied to any situation where knowledge of the existence or non-existence of a set static or dynamic pressure is desired.

2. Description of Prior Art

A major problem associated with soil back-filling is uneven soil compaction which results in sagging of the ditch surface over time. Several methods are used currently to monitor soil compaction; however, all of these methods are reasonably difficult to use, requiring external instrumentation and trained personnel.

Various devices are known for warning of the presence of underground installations, such as gas distribution pipes and buried cable, which employ the principle of releasing a detectable material, such as smoke or an odoriferous chemical, when struck by an element intruding into the space surrounding the underground installation, such as machinery used for excavation. U.S. Pat. No. 3,581,703 teaches a warning tape which is used to signal the presence of underground installations, which warning tape includes capsules containing a smoke-releasing or otherwise attention-compelling chemical substance, which is released when the tape is ruptured. U.S. Pat. No. 3,718,113 teaches a buried visual warning device capable of producing a risable visible signal consisting of an underground corrosion-resistant, flexible, rupturable, essentially moisture and oxygen proof, tubular member containing a visual signal producing means, such as smoke, which is released into the air upon rupture of the tubular member.

U.S. Pat. No. 3,844,248 teaches a device and process for warning against impending rock falls in underground excavation consisting of a normally inactive chemiluminescent assemblage containing two isolated reactive components which, when mixed in response to mechanical deformation of the assemblage, for example by a shift in underground rock formation, give off a chemiluminescent glow to any person in the vicinity of the device.

U.S. Pat. No. 3,520,275 teaches a smoke signal device having two or more readily breakable containers, for example glass, disposed adjacent to each other and containing a material which produces smoke upon access of air and/or moisture, or as the result of mixing of two or more components upon breakage of the containers by projectiles which are driven into the containers by a detonator ignited propellant charge.

U.S. Pat. No. 4,698,623 teaches an overload detection apparatus for monitoring structures and structural members for overloads having an elongated frangible closed ended tube containing a dense, visible liquid. The tube includes a central reduced cross-sectional area for forming a weak portion thereof which fractures when exposed to a preselected level of an acceleration force, causing the liquid in the tube to be deposited in a transparent shield enclosing the tube, thereby indicating the occurrence of an overload.

Although providing means for detecting a change in the condition of the devices taught by the prior art discussed hereinabove, none of these devices are responsive to the static or dynamic pressure conditions surrounding them and, thus, none of these devices are suitable for determining whether a condition measured as a function of static or dynamic pressure, such as soil compaction, has been satisfied.

SUMMARY OF THE INVENTION

According, it is an object of this invention to provide a device that can indicate that a predetermined static or dynamic pressure objective, produced by hydrostatic, atmospheric, or soil compaction forces, has been achieved.

It is another object of this invention to provide a device which can detect that a specific soil compaction density has been achieved following, for example, soil back-filling.

It is another object of this invention to provide a device for indicating that a predetermined static or dynamic pressure of objective has been achieved which requires no electronics, field calibration, or maintenance to make the device usable.

It is another object of this invention to provide a device which can indicate the existence of a predetermined static or dynamic pressure, which indication can be observed by human sense, that is visually, audibly, or by olfactory means.

It is another object of this invention to provide a device for indicating the existence of a predetermined static or dynamic pressure which can be manufactured to varying standards to accommodate operation under a broad range of static or dynamic pressure conditions.

It is yet another object of this invention to provide a device for detecting that a specific soil compaction density has been achieved which can be manufactured to varying standards to accommodate variations in soil types.

It is yet another object of this invention to provide a device for detecting that a specific soil compaction density has been achieved which is reliable and repeatable.

It is yet another object of this invention to provide a device capable of indicating that a set barometric pressure or atmospheric pressure has been reached.

It is still another object of this invention to provide a device which can provide a warning of overloading conditions involving truck, train, and barge transport of grains and like materials.

It is yet another object of this invention to provide a device which can be used to measure density in concrete and molten metals.

These and other objects of this invention are achieved by a set pressure sensing device for indicating the existence of a predetermined static or dynamic pressure condition comprising at least one shell material forming an enclosure, failure means for inducing a failure of the shell material at a preset static pressure or a preset dynamic pressure, and detector means for detecting the failure of the shell material, the detector means being disposed within the enclosure. The main characteristic of the shell material of this invention is its ability to deform and fail due to pressures exerted on it. To promote the failure of the shell material at a preset static or dynamic pressure, means for inducing the failure of said shell material, for example failure planes, are provided. Upon failure of the shell material at the preset static or dynamic pressure, detector means disposed within the enclosure are released, for example, smoke, which is readily determinable by human senses, thereby indicating that the shell material has failed and the desired preset static or dynamic pressure condition has been reached.

Because the device can be triggered solely by the attainment of a preset static or dynamic pressure, it is suitable for use in a wide range of applications. For example, the device can be placed in a utility ditch line during back-filling to verify that soil compaction of a required density has been achieved. Similarly, the device can also be used to measure density in concrete and molten metals.

The device can also be used to indicate that a set barometric pressure or atmospheric pressure has been reached, an application which could be useful in weather balloon operation. The device can also be used to indicate the existence of an overloading condition in vehicles such as trucks, trains, and barges used for transport of grains and like materials.

BRIEF DESCRIPTION OF THE DRAWINGS

These and other objects and features of this invention will be better understood from the following detailed description taken in conjunction with the drawings, wherein:

FIG. 6 is a cross-sectional view of a blister pack device in accordance with one embodiment of this invention;

DESCRIPTION OF PREFERRED EMBODIMENTS

The set pressure sensing device of this invention is a device which indicates that a predetermined static or dynamic pressure objective, produced by hydrostatic, atmospheric, or soil compaction forces, has been achieved. Accordingly, this device is suitable for detecting that a specific soil compaction density has been achieved following, for example, soil back-filling.

Figure 3:
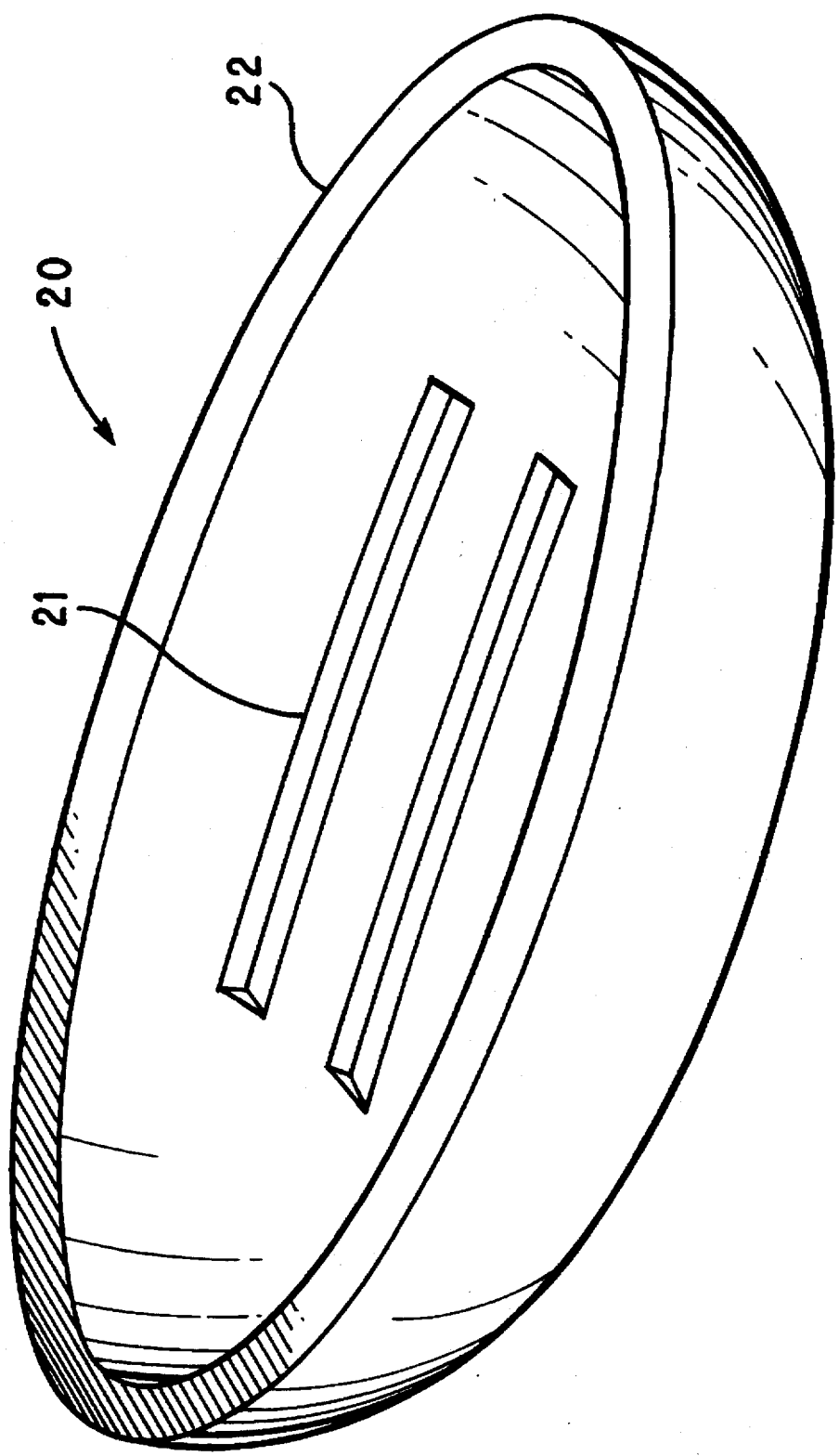
FIG. 3 is a partial cross-sectional view of a portion of a capsule shaped device in accordance with one embodiment of this invention.
Figure 4:
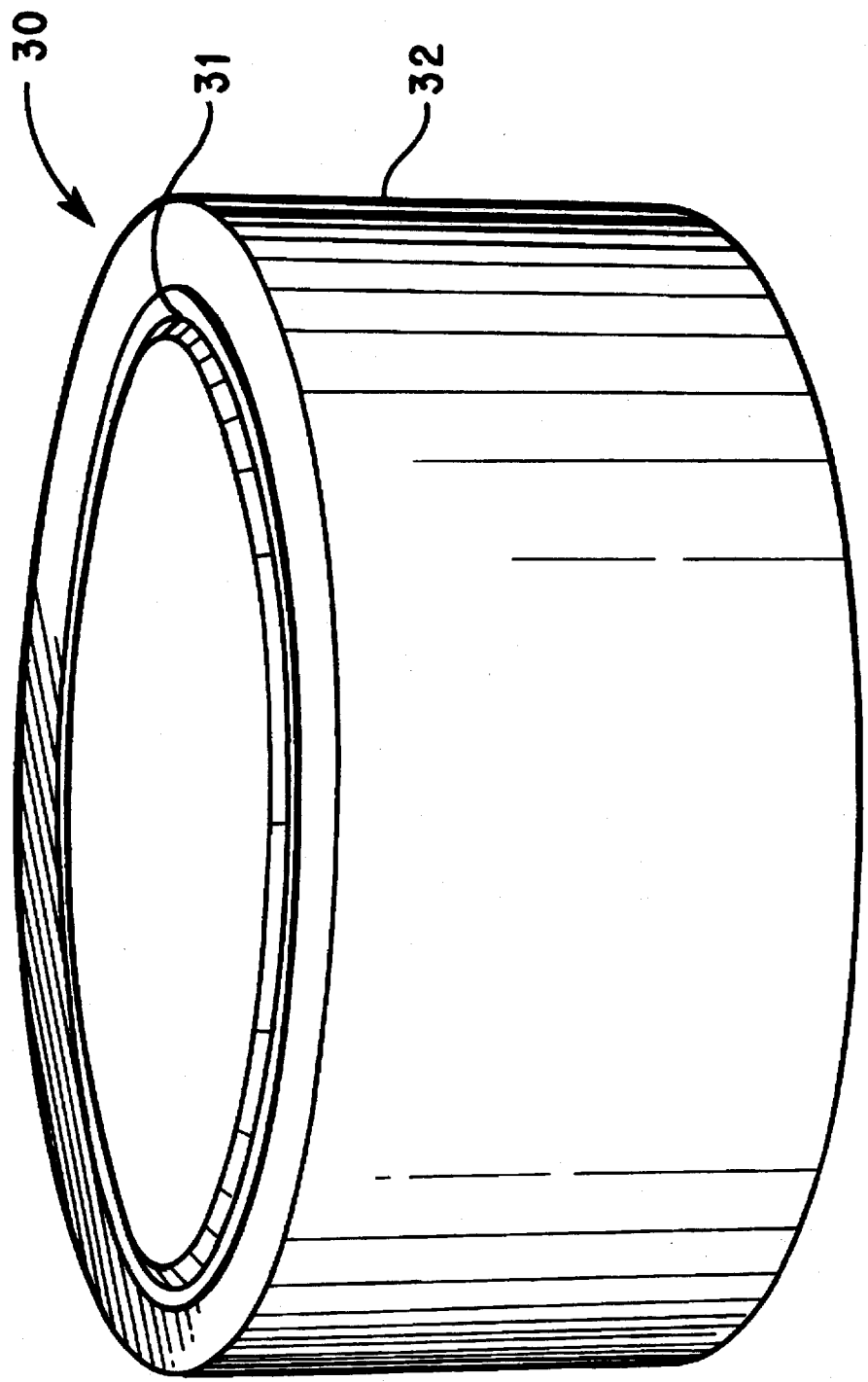
FIG. 4 is a perspective view of a tablet shaped device in accordance with one embodiment of this invention.
Figure 5:
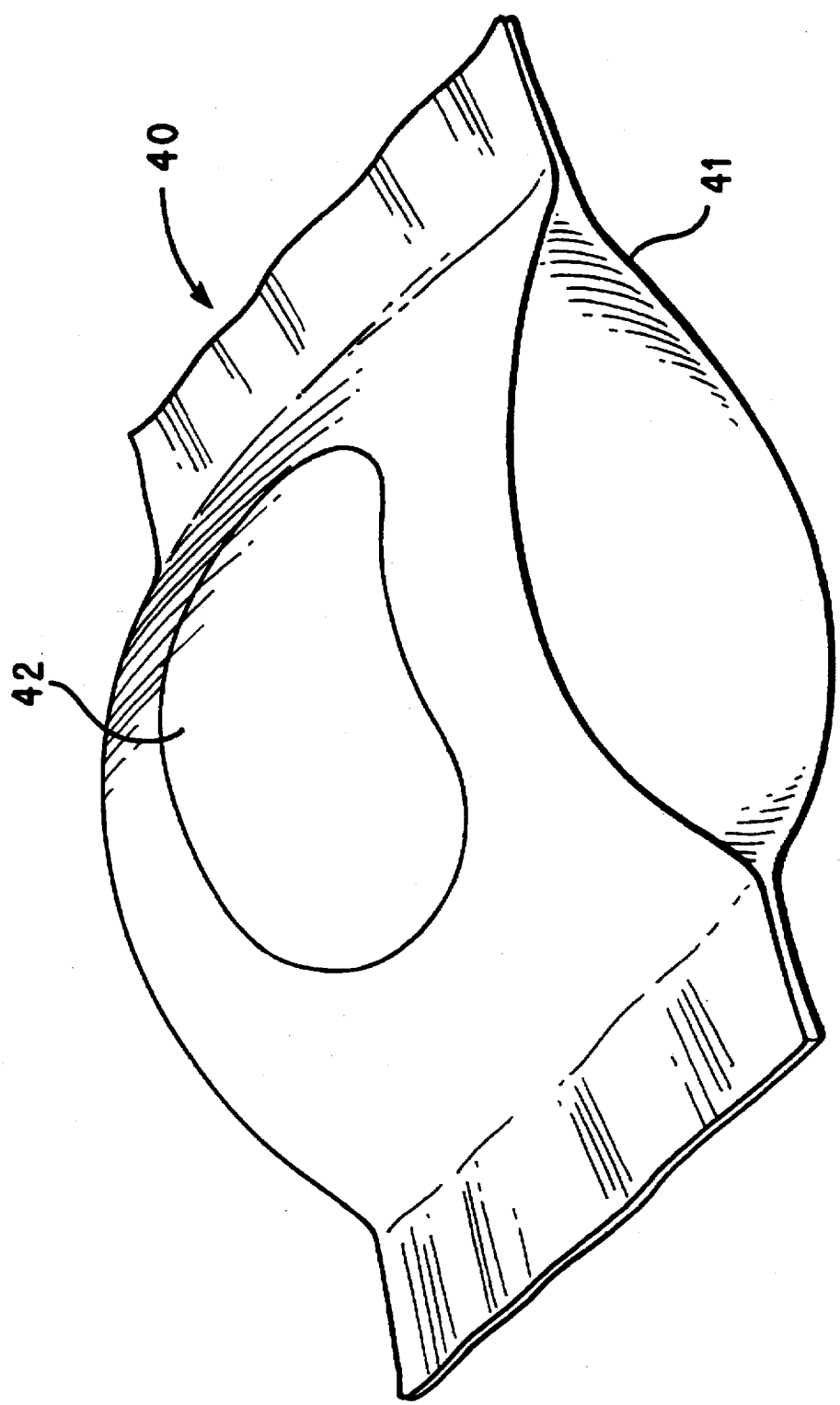
FIG. 5 is a schematic diagram of a rupture pouch device in accordance with one embodiment of this invention.

As can be seen in FIGS. 1, 3, 4, 5, and 6, the set pressure sensing device of this invention is susceptible to a variety of geometric shapes including regular polygons, spheres, cylinders and forms such as pouch detector 40 shown in FIG. 5 and blister pack 50 shown in FIG. 6. Each embodiment of the device comprises at least one shell material which forms an enclosure, failure means for inducing a failure of the shell material at a preset static or dynamic pressure, and detector means for detecting the failure of the shell material. The main characteristic of the shell material is that it is designed to deform and fail due to pressures exerted thereon. Accordingly, any material having this characteristic may be employed as a shell material. Depending upon the particular embodiment of the device of this invention, the shell material is preferably made of a material selected from the group consisting of metal, plastic, cellulose, paraffin, rubber, glass, and mixtures or combinations thereof.

Figure 2:
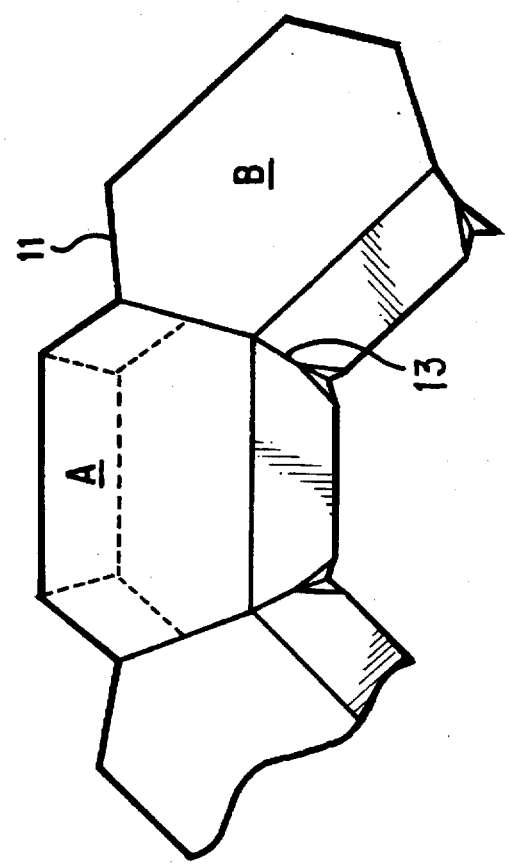
FIG. 2 is a schematic diagram of an engineered internal failure plane for a device in accordance with one embodiment of this invention.
Figure 1:
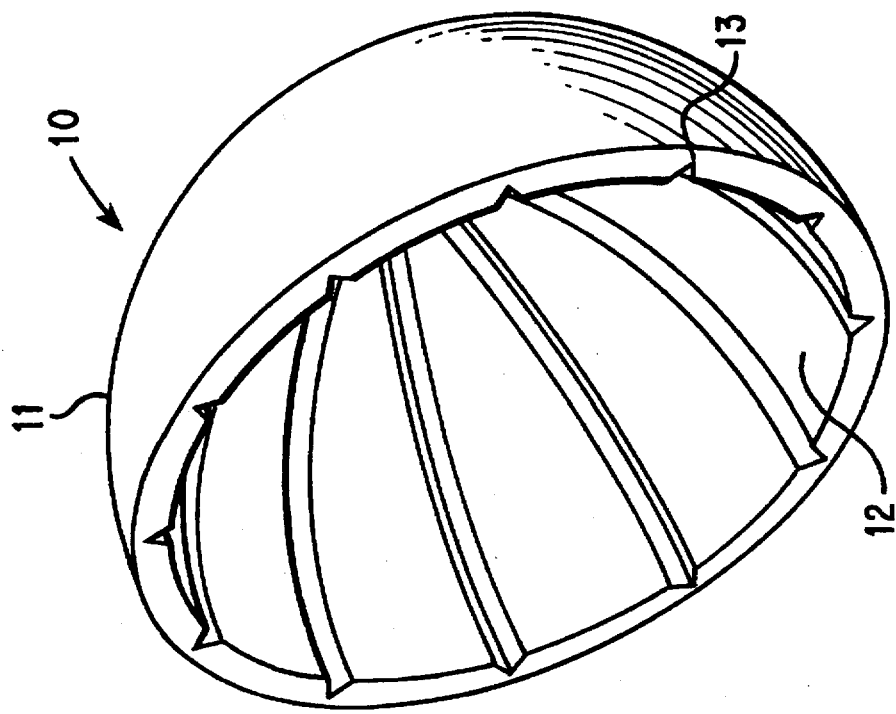
FIG. 1 is a partial cross-sectional view of a portion of a spherical shaped device in accordance with one embodiment of this invention.

FIG. 1 shows spherical detector 10 in accordance with one embodiment of this invention comprising shell material 11 which forms enclosure 12. There are several mechanisms that can be employed to provide failure of shell material 11 when a predetermined pressure or density has been achieved. In accordance with one embodiment of this invention, shell material 11 comprises at least one failure plane 13 formed in either the internal or external surface of shell material 11. A detail of a failure plane 13 of shell material 11 in accordance with one embodiment of this invention is shown in FIG. 2. Failure plane 13 is designed such that when the desired set pressure surrounding the exterior of the device has been achieved, shell material 11 will deform and fail along failure plane 13. It will be apparent to those skilled in the art that the device of this invention may be designed to fail either when the pressure external to the device exceeds the internal pressure by a desired amount or, alternatively, the external pressure is less than the internal pressure, causing the device to rupture, such as in weather balloon applications.

FIG. 3 shows a portion of a capsule detector 20 in accordance with one embodiment of this invention comprising shell material 22 and failure planes 21.

FIG. 4 shows a tablet detector 30 in accordance with one embodiment of this invention comprising shell material 32 and failure plane 31.

Failure planes 13, 21, 31 are all elements which can be manufactured, for example stereo-lithography or simple machining into the shell material 11, 22, 32 comprising the detectors 10, 20, 30 of this invention. Their function is to cause the shell material to rupture at an engineered pressure. Failure planes 13, 21, 31 are either internal or external to the detector depending upon whether the detector is to implode or explode in its failure mode.

Figure 7:
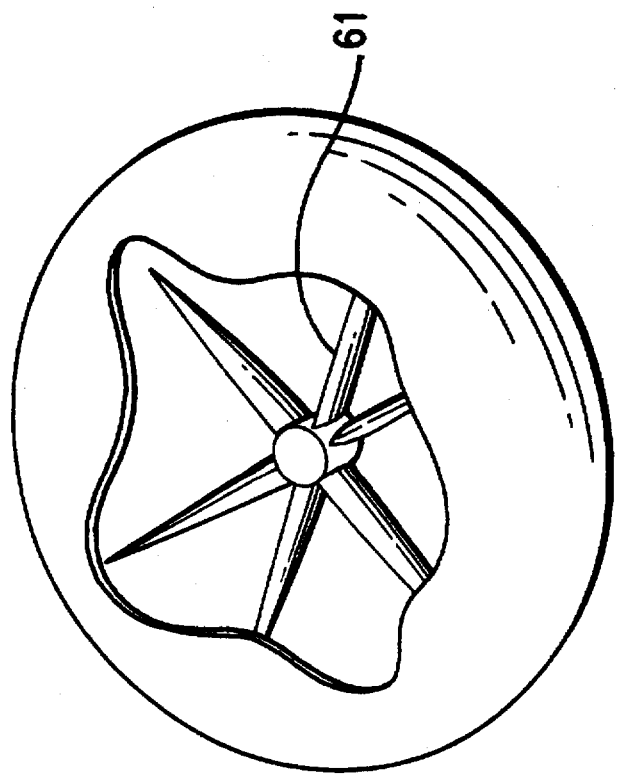
FIG. 7 is a schematic diagram showing means for piercing the shell material of a device in accordance with one embodiment of this invention.

Said failure means of said device in accordance with one embodiment of this invention comprises puncture means which function to puncture the shell material of the device when the shell material is deformed. Such a device in the form of jack 61 may be incorporated internally in the enclosure formed by shell material 11 as shown in FIG. 7. Although shown as internal to the shell formed by shell material 11, it will be apparent to those skilled in the art that jack 61 may alternatively be disposed external to the shell.

FIG. 5 shows a pouch detector 40 comprising shell material 41, preferably of polyethylene, and a thin foil membrane 42 incorporated into shell material 41. In accordance with this embodiment, when the desired pressure has been achieved, the foil membrane fails, releasing detector means for detecting the failure of shell material 41.

Yet another embodiment of a device for detecting the achievement of a set pressure in accordance with this invention is a blister pack 50 shown in FIG. 6, comprising shell material 51 secured to rigid substrate 52 and in which is incorporated foil membrane 53. Upon puncture of shell material 51 or foil membrane 53, detector means disposed within the enclosure formed by shell material 51 and foil membrane 53 is released, thereby enabling detection of the failure of blister pack 50.

Suitable detector means for detecting the failure of the shell material are numerous. One of the requirements of said detector means is that detection of the shell material failure is by simple means, such as human senses-visual, audible, and/or olfactory. In addition, said detector means must also be reliable. Said detector means in accordance with one embodiment of this invention comprises at least one odoriferous chemical enclosed within enclosure 12 formed by shell material 11 such that, upon failure of shell material 11, the odoriferous chemical is released from enclosure 12, giving off a readily detectable odor. Suitable odoriferous chemicals for use in accordance with the device of this invention include ethyl acetate, methyl formate, methyl acetate, ethyl ether, acetone, methyl ethyl ketone, amyl acetate, propyl mercaptan, and vanillin.

Suitable detector means for detecting the failure of shell material 11 in accordance with another embodiment of this invention comprises a material which is readily visible when exposed to air. Such materials include phosphorescent dyes, smoke and florescent materials.

Figure 8:
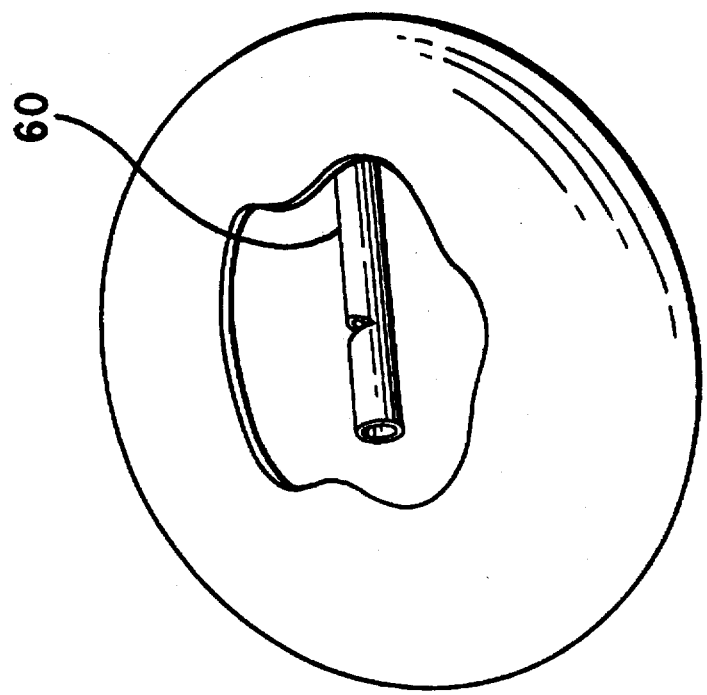
FIG. 8 is a schematic diagram showing a noise whistle for an audio alert disposed within a device in accordance with one embodiment of this invention.

In accordance with yet another embodiment of this invention, said detector means comprises an audio whistle 60 as shown in FIG. 8 which produces an auditory signal as a result of sudden changes in pressure. In accordance with one embodiment of this invention, audio whistle 60 comprises a rupture membrane over one or both ends of a pipe such that when the rupture membrane fails due to having reached the set pressure, an indicator gas disposed within the pipe is expelled through the end of the pipe, making an audible sound.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A device for detecting soil compaction density comprising:

at least one shell material forming an enclosure;

said at least one shell material including failure means within the shell material for causing failure of said shell material when external pressure on the enclosure exceeds one of a preset static pressure and a preset dynamic pressure; and detector means for permitting detection of said failure of said at least one shell material, said detector means disposed within said enclosure.

2. A device in accordance with claim 1, wherein said at least one shell material is deformable.

3. A device in accordance with claim 1, wherein said detector means comprises at least one of visual and olfactory means for detecting said failure of said at least one shell material.

4. A device in accordance with claim 2, wherein said failure means comprises at least one failure plane formed within said at least one shell material.

5. A device in accordance with claim 2, wherein said at least one shell material is selected from the group consisting of metal, plastic, cellulose, paraffin, rubber, glass and combinations and mixtures thereof.

6. A device in accordance with claim 3, wherein said detector means comprises a material selected from the group consisting of phosphorescent dies, odoriferous chemicals, smokes and combinations thereof.

* * * * *